US008424525B2

(12) United States Patent
Peacey et al.

(10) Patent No.: US 8,424,525 B2
(45) Date of Patent: Apr. 23, 2013

(54) BREATHING GAS SUPPLY SYSTEM

(75) Inventors: David John Peacey, Somerset (GB); Kraig Charles Murley, Somerset (GB)

(73) Assignee: Honeywell Normalair-Garrett (Holdings) Ltd., Yeovil, Somerset (GB)

( * ) Notice: Subject to any disclaimer, the term of this patent is extended or adjusted under 35 U.S.C. 154(b) by 1938 days.

(21) Appl. No.: 10/808,658

(22) Filed: Mar. 25, 2004

(65) Prior Publication Data

US 2013/0042870 A1 Feb. 21, 2013

Related U.S. Application Data

(63) Continuation of application No. PCT/GB02/04149, filed on Sep. 12, 2002.

(30) Foreign Application Priority Data

Sep. 28, 2001 (GB) .................................. 0123310.5

(51) Int. Cl.
*A62B 7/00* (2006.01)
*B01D 53/047* (2006.01)

(52) U.S. Cl.
USPC ................ 128/205.11; 95/19; 95/96; 95/130; 96/111; 96/113; 96/130; 96/140; 128/200.24; 128/204.18; 128/204.21; 128/204.22; 128/202.26

(58) Field of Classification Search ............ 96/108–121, 96/130, 133, 143, 144; 95/95, 97, 98, 8, 95/23, 90, 104, 105, 130, 19, 96; 244/118.5; 128/200.24, 202.26, 204.18, 204.22, 204.29, 128/205.11, 204.21
See application file for complete search history.

(56) References Cited

U.S. PATENT DOCUMENTS

| | | | | | |
|---|---|---|---|---|---|
| 4,259,091 | A | * | 3/1981 | Benkmann | 95/98 |
| 4,359,328 | A | * | 11/1982 | Wilson | 95/98 |
| 4,449,990 | A | * | 5/1984 | Tedford, Jr. | 95/26 |
| 4,543,109 | A | * | 9/1985 | Hamlin et al. | 95/98 |
| 4,870,960 | A | * | 10/1989 | Hradek | 128/202.22 |
| 4,927,434 | A | * | 5/1990 | Cordes et al. | 95/15 |
| 4,960,119 | A | * | 10/1990 | Hamlin | 128/204.18 |
| 5,004,485 | A | * | 4/1991 | Hamlin et al. | 96/111 |
| 5,071,453 | A | * | 12/1991 | Hradek et al. | 96/111 |
| 5,119,423 | A | * | 6/1992 | Shiraki et al. | 704/219 |
| 5,199,423 | A | * | 4/1993 | Harral et al. | 128/202.26 |
| 5,314,402 | A | * | 5/1994 | Foote et al. | 600/20 |
| 5,531,807 | A | * | 7/1996 | McCombs | 95/26 |
| 5,578,115 | A | * | 11/1996 | Cole | 96/121 |
| 5,809,999 | A | * | 9/1998 | Lang | 128/200.24 |

(Continued)

*Primary Examiner* — Annette Dixon
(74) *Attorney, Agent, or Firm* — MacMillan, Sobanski & Todd, LLC

(57) ABSTRACT

A breathing gas supply system for an aircraft includes a plurality of oxygen concentrating apparatus, each of which in use, is operable to supply oxygen enriched gas to a breathing gas supply. Each oxygen concentrating apparatus includes at least two active molecular sieve beds which are operable so that while one sieve bed is adsorbing non-oxygen gas from a pressurized gas supply, the or another bed is being purged of non-oxygen gas by subjecting the bed to lower pressure. Each oxygen concentrating apparatus includes an oxygen enriched gas flow control device which permits the flow of oxygen enriched gas produced by the oxygen concentrating apparatus to the breathing gas supply and permits a restricted flow of oxygen enriched gas from the breathing gas supply to the oxygen concentrating apparatus. Oxygen enriched gas produced by the adsorbing sieve bed flows direct to the bed being purged.

11 Claims, 3 Drawing Sheets

U.S. PATENT DOCUMENTS 5,858,063 A * 1/1999 Cao et al. .......................... 95/11
5,906,672 A * 5/1999 Michaels et al. .................. 95/12
6,077,331 A * 6/2000 Phillips ............................. 95/12
6,383,256 B1 * 5/2002 Phillips ............................. 95/12
6,558,451 B2 * 5/2003 McCombs et al. ................ 95/98
6,669,758 B1 * 12/2003 Hart et al. ........................... 95/8
6,701,923 B2 * 3/2004 Cazenave et al. ........ 128/204.22
6,712,876 B2 * 3/2004 Cao et al. .......................... 95/10
6,846,347 B2 * 1/2005 Phillips et al. ...................... 95/8
6,948,498 B2 * 9/2005 Cazenave et al. ........ 128/204.22
6,997,970 B2 * 2/2006 Crome ................................ 95/8
7,055,780 B2 * 6/2006 Phillips ...................... 244/118.5
2003/0233936 A1 * 12/2003 Crome .............................. 95/96
2004/0040437 A1 * 3/2004 Cao et al. .......................... 95/21
2004/0083886 A1 * 5/2004 Phillips et al. .................. 95/138
2004/0244585 A1 * 12/2004 Meckes et al. .................. 95/138

* cited by examiner

BREATHING GAS SUPPLY SYSTEM

CROSS-REFERENCE TO RELATED APPLICATIONS

Priority is claimed to United Kingdom patent application Serial No. 0123310.5 filed Sep. 28, 2001. This is a continuation PCT patent application No. PCT/GB02/04149 filed Sep. 12, 2002.

STATEMENT REGARDING FEDERALLY SPONSORED RESEARCH OR DEVELOPMENT

Not Applicable.

TECHNICAL FIELD

This invention relates to a breathing gas supply system for supplying oxygen enriched gas for breathing, in an aircraft.

BACKGROUND OF THE INVENTION

Conventionally, in an aircraft of the kind which has a crew or passenger cabin which is pressurized to enable the aircraft to fly at high altitudes without providing a local oxygen supply to each passenger and crew member e.g. via a breathing mask, an emergency oxygen supply is available for use in the event that the cabin becomes depressurized. Such emergency oxygen supply may be provided from compressed gas storage containers and/or by combining two or more chemicals which undergo a reaction which produces oxygen gas (e.g. chlorate candles), and would be supplied to passengers and crew by individual breathing masks.

By providing such an emergency supply of oxygen gas, time is available for a pilot to reduce flying height to an altitude where the crew and passengers may again breath atmospheric gases. However such an emergency supply is only available for a short period of time.

It is usual practice particularly in the case of civilian aircraft, for flying routes taken by aircraft to be arranged such that in the event of an emergency, such as cabin decompression, the aircraft is within 30 minutes or so flying time from land. Thus for safety's sake, the route taken by an aircraft may not be the shortest and most economical route.

Moreover, even though an aircraft may be within 30 minutes flying time from land, often a suitable landing ground is not available for landing the aircraft within this flying range e.g. the nearest land may be hostile territory, and where an aircraft is constrained to fly at relatively low altitude, typically less than 10,000 feet, during low altitude flight over some land masses, the aircraft may encounter terrain at a height at or greater than 10,000, or adverse weather conditions.

It is known more particularly for military aircraft, for a breathing gas supply system to be provided which is capable of supplying oxygen or oxygen enriched gas for breathing, indefinitely. Such breathing gas supply system may be an oxygen concentrating apparatus of the molecular sieve bed type which when operated adsorbs non-oxygen gas from a gas supply thus to provide a gas which is sufficiently oxygen enriched for breathing at higher altitudes.

In a military aircraft application, for different missions, different numbers of personnel may be aboard the aircraft, and accordingly a variable capacity breathing gas supply means is required.

Such molecular sieve bed type oxygen concentrating apparatus tend to work most efficiently particularly in terms of start-up time, where of relatively small capacity. To use such technology in a civilian aircraft with a large number of passengers, or in a military aircraft with many personnel, would thus require a plurality of such oxygen concentrating apparatus. For passenger aircraft now being proposed which will be capable of carrying 700 passengers or more, it will be appreciated that a substantial number of oxygen concentrating apparatus would be required to ensure an adequate oxygen supply for all passengers in the event of an emergency. Additionally because such oxygen concentrating apparatus are not readily able to produce oxygen instantly, conventionally it would still be necessary to carry e.g. compressed oxygen which can be used in the event of an emergency decompression, until such oxygen concentrating apparatus come on line. All this adds to the weight of the aircraft, which is undesirable for economic reasons.

The large civilian aircraft now being proposed will be intended to fly at greater heights than conventional, e.g. heights above 40,000 feet, and thus the emergency gas requirement is not only enlarged by the shear number of passengers, but also by the time requirement for the aircraft safely to descend from these increased heights, to a safe low flying altitude at which the passengers can breath atmospheric gases.

Also, for such oxygen concentrating apparatus which include one or more molecular sieve beds, it is desirable to keep the molecular sieve beds dry and free from contaminates such as non-oxygen gas, in order that in the unlikely event of an emergency in a civil aircraft, or when it is necessary to increase the capacity of the breathing gas system in a military aircraft, rapid production of high concentration oxygen is possible. To enable this to be achieved, periodic operation of the molecular sieve beds is necessary.

In our previous patent application WO-A-02/04076 there is disclosed a method of operating a life support system for an aircraft, the system including a plurality of oxygen concentrating apparatus, each of which in use is operable to supply at least oxygen enriched gas to a breathing gas supply, at least one of the oxygen concentrating apparatus being a main concentrating apparatus and the remainder being auxiliary oxygen concentrating apparatus, the main oxygen concentrating apparatus being operable independently of the auxiliary oxygen concentrating apparatus, the method including operating the main oxygen concentrating apparatus in a non-emergency situation, and supplying at least oxygen enriched gas to each of the auxiliary oxygen concentrating apparatus to maintain them in a condition ready for immediate operation in the event of an emergency.

The oxygen concentrating apparatus, each includes at least two active molecular sieve beds which when operated e.g. in an emergency in a civil aircraft application, are operated in tandem, symmetrically or non-symmetrically, so that whilst one sieve bed is adsorbing non-oxygen gas from a pressurized gas supply, the other bed is being purged of non-oxygen gas by subjecting the bed to lower pressure.

In our previous proposal when one or more auxiliary oxygen concentrating apparatus is being operated to produce oxygen enriched gas, with one of the beds at least being purged, and when it is desired to condition the molecular sieve beds ready for use, at least oxygen enriched gas is fed to the bed or beds being purged to assist in desorbing non-oxygen gas from the molecular sieve beds. Such oxygen enriched gas is obtained in the main from the breathing gas supply, the flow of oxygen enriched gas from the breathing gas supply to the bed or beds being purged, being restricted e.g. by a simple orifice.

However, in an emergency situation for example when the main and auxiliary oxygen concentrating apparatus are operated to produce oxygen enriched gas for breathing, it has been found that too much breathing gas from the breathing gas supply may be used for purging purposes thus adversely affecting system performance.

BRIEF SUMMARY OF THE INVENTION

According to a first aspect of the invention we provide a breathing gas supply system for an aircraft the system including a plurality of oxygen concentrating apparatus, each of which in use, is operable to supply oxygen enriched gas to a breathing gas supply, each oxygen concentrating apparatus including at least two molecular sieve beds which are operable so that whilst one sieve bed is adsorbing non-oxygen gas from a pressurized gas supply, the or another bed is being purged of non-oxygen gas by subjecting the bed to lower pressure, each oxygen concentrating apparatus including an oxygen enriched gas flow control device which permits the flow of oxygen enriched gas produced by the oxygen concentrating apparatus to the breathing gas supply and permits a restricted flow of oxygen enriched gas from the breathing gas supply to the oxygen concentrating apparatus, there being a flow path for oxygen enriched gas produced by the adsorbing sieve bed of the oxygen concentrating apparatus direct to the bed being purged.

Thus in accordance with the present invention, the oxygen enriched gas flow control device may be arranged to permit only a small flow of oxygen enriched gas from the breathing gas supply to the respective oxygen concentrating apparatus for assisting purging, so that the availability of oxygen enriched gas in the breathing gas supply for breathing e.g. in an emergency situation, is not compromised. Preferably therefore, the flow path for oxygen enriched gas produced by the adsorbing sieve bed of the oxygen concentrating apparatus direct to the bed being purged, permits oxygen enriched gas for assisting purging, preferentially to be provided from the adsorbing molecular sieve bed of the oxygen concentrating apparatus rather than the breathing gas supply.

The oxygen enriched gas flow control device for each oxygen concentrating apparatus may include a first flow path including a non-return valve, which permits of substantially free flow of oxygen enriched gas produced by the oxygen concentrating apparatus, to the breathing gas supply, and a second flow path which includes a restrictor which restricts the flow of oxygen enriched gas from the breathing gas supply to the oxygen concentrating apparatus. The restrictor may include a simple orifice through which the oxygen enriched gas is constrained to flow, or may include a variable orifice the cross section of which may be varied according to operating conditions, by a system controller.

The flow path for oxygen enriched gas produced by the adsorbing sieve bed of the oxygen concentrating apparatus direct to the bed being purged, may include a simple orifice to restrict the flow of oxygen enriched gas for assisting purging, along the flow path.

To ensure that oxygen enriched gas for purging preferentially is obtained from the adsorbing molecular sieve bed of the oxygen concentrating apparatus rather than the breathing gas supply, the orifice in the flow path for the oxygen enriched gas for assisting purging, may be larger than the orifice in the second flow path of the oxygen enriched gas flow control means.

The molecular sieve beds of the oxygen concentrating apparatus may be operated to produce oxygen enriched gas, in tandem where the oxygen concentrating apparatus includes two molecular sieve beds, symmetrically or non-symmetrically, or where the oxygen concentrating apparatus includes three molecular sieve beds, the three beds may be operated symmetrically or non-symmetrically such that at least one of the beds is adsorbing non-oxygen gas from a pressurized gas supply, whilst another of the beds is being purged of non-oxygen gas.

In one embodiment at least one of the oxygen concentrating apparatus is a main oxygen concentrating apparatus and the remainder of the oxygen concentrating apparatus is or are auxiliary oxygen concentrating apparatus, the main oxygen concentrating apparatus being operable independently of the auxiliary oxygen concentrating apparatus, so that the main oxygen concentrating apparatus is operable alone in a non-emergency situation, to supply oxygen enriched gas to the or each of the auxiliary oxygen concentrating apparatus, e.g. via the oxygen enriched gas flow control device and the breathing gas supply.

According to a second aspect of the invention we provide a method of operating a breathing gas supply system for an aircraft, in which the system includes a plurality of oxygen concentrating apparatus, each of which in use, is operable to supply oxygen enriched gas to a breathing gas supply, each oxygen concentrating apparatus including at least two molecular sieve beds which are operable so that whilst one sieve bed is adsorbing non-oxygen gas from a pressurized gas supply, the or another bed is being purged of non-oxygen gas by subjecting the bed to lower pressure, each oxygen concentrating apparatus including an oxygen enriched gas flow control device and there being a flow path for oxygen enriched gas produced by the adsorbing sieve bed of the oxygen concentrating apparatus direct to the bed being purged, the method including operating the oxygen enriched gas flow control device to permit the flow of oxygen enriched gas produced by the oxygen concentrating apparatus to the breathing gas supply and to permit a restricted flow of oxygen enriched gas from the breathing gas supply to the oxygen concentrating apparatus, and permitting oxygen enriched gas produced by the adsorbing sieve bed of the oxygen concentrating apparatus to flow direct to the bed being purged.

The breathing gas supply system may have any of the features of the breathing gas supply system of the first aspect of the invention.

Embodiments of the invention will now be described with reference to the accompanying drawings.

DETAILED DESCRIPTION OF THE INVENTION

Figure 1:
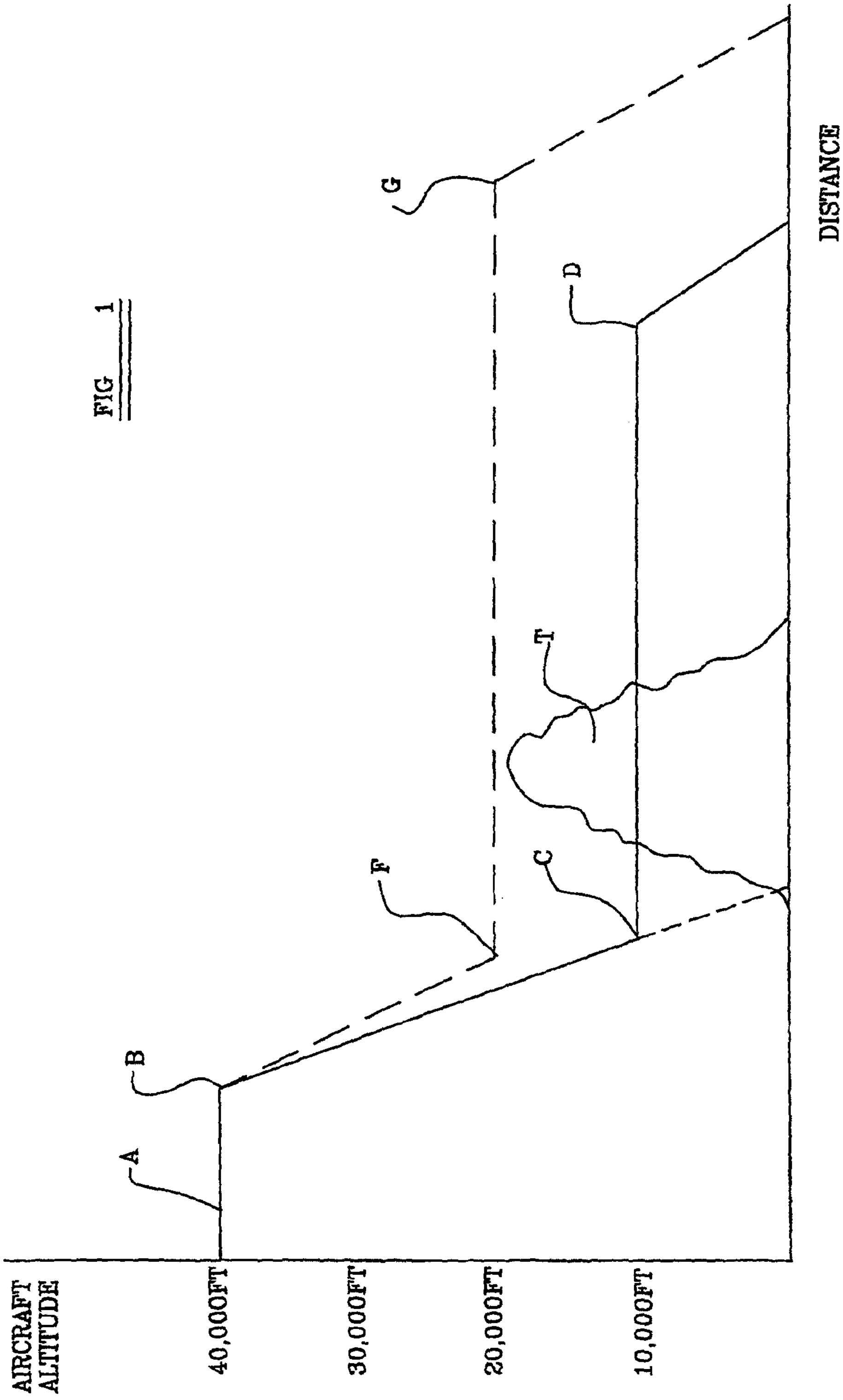
FIG. 1 is an illustrative graph showing an aircraft flight profile in the event of an emergency cabin decompression both conventionally and using a life support system of the kind described below.

Referring first to FIG. 1 there is shown a typical flight profile of an aircraft in the event of an emergency decompression.

In this example, civilian aircraft flying at 40,000 feet (line A), when experiencing an emergency compression at B, would rapidly descend to a low altitude C of 10,000 feet or less. During this descent, an emergency supply of oxygen would be provided to crew and passengers of the aircraft, from compressed oxygen storage containers, or as result of a chemical reaction between two or more reagents. At 10,000 feet C, the passengers at least can safely breath atmospheric air. The aircraft continues to fly at this low altitude until it is safe to descent to land D, or until the pilot decides it is safer to ditch the aircraft in the sea.

It will be appreciated that terrain T in many land masses extends above 10,000 feet, and thus conventionally there is a risk that during low altitude flight, such terrain will be encountered. Moreover, because the aircraft has to fly at a low altitude, its flying range is restricted within a 30 minute period during which it is preferred to land the aircraft, or by the amount of fuel available.

By using a breathing gas supply system as illustrated and described below, an alternative yet safe flight profile is possible, in which upon decompression B the aircraft descends to a safe holding altitude F, which would be above 10,000 feet, and preferably is at least 15,000 feet and more preferably about 20,000-25,000 feet, whilst the passengers and crew are supplied with oxygen enriched gas for breathing by the breathing gas supply system. By flying at this enhanced height, the aircraft flying range within the target 30 minutes, is increased, giving more opportunity for the pilot to find a suitable airfield or other landing spot, and using less fuel.

Thus during the 30 minute flying time target the aircraft may fly further before descending for landing, G.

Utilizing the breathing gas supply system as illustrated and described below as a life support system, it is possible for an aircraft to be routed to fly along shorter, more economic routes to a destination, without compromising safety, and without compromising the target 30 minutes to land in the event of an emergency.

Figure 2:
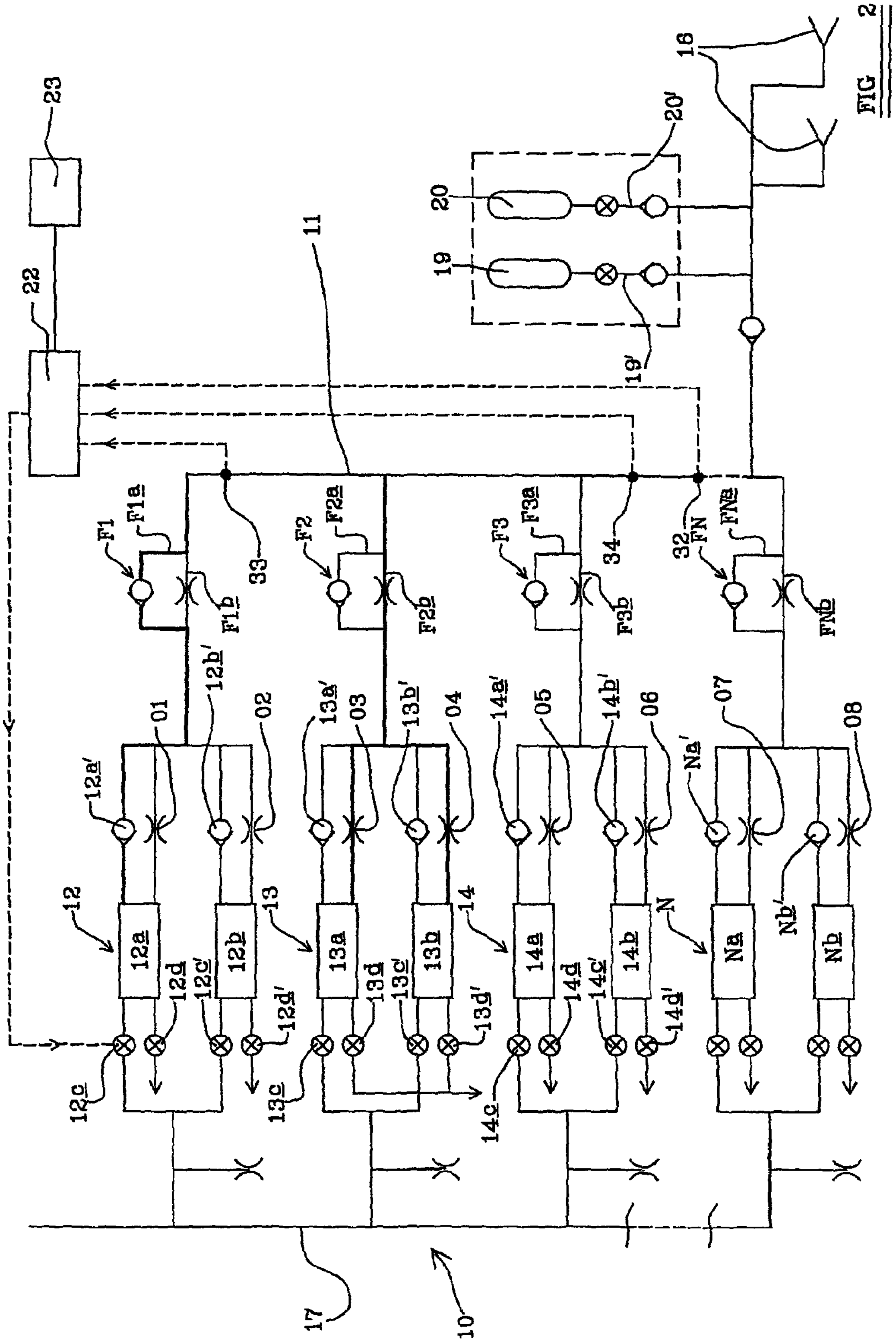
FIG. 2 is an illustrative view of a breathing gas supply system in accordance with the present invention.

Referring now to FIG. 2, a breathing gas supply system in accordance with the invention, which is an aircraft life support system 10, is illustrated. This system 10 includes a breathing gas supply, being a line 11 common to a plurality of oxygen concentrating apparatus 12, 13, 14 . . . N. The breathing gas supply line 11 delivers oxygen enriched gas for breathing to individual breathing masks 16 to be worn by passengers in the aircraft in the event of an emergency cabin decompression. However in another example, the breathing gas supply may be used for therapeutic purposes, for example where the aircraft is used for carrying casualties which may require oxygen, the items indicated at 16 in that example being outlets for the oxygen enriched gas to be supplied to casualties as required therapeutically.

Each oxygen concentrating apparatus includes in this example, a pair of molecular sieve beds 12*a*, 12*b*; 13*a*, 13*b*; etc. the beds 12*a*, 12*b*; 13*a*, 13*b* etc. of each pair being operable in tandem so that in operation, one of the beds 12*a*, 13*a* etc. of the pair is actively adsorbing non-oxygen gas from a pressurized gas supply, whilst the other bed 12*b*, 13*b* etc. of each pair is being purged of non-oxygen gas under low pressure. The beds 12*a*, 12*b* etc. of each pair may be operated symmetrically with each bed 12*a*, 12*b* etc. being operated to adsorb and desorb non-oxygen gas for generally equal periods of time, or non-symmetrically as desired.

The construction and operation of molecular sieve bed type oxygen concentrating apparatus or generators, known as MSOGS is well known and a detailed description of the operation of such MSOGS is not considered necessary for the understanding of the invention. Typically though, the molecular sieve beds would include a bed material such as Zeolite which adsorbs non-oxygen gas when a pressurized gas supply 17, for example bled from an engine compressor, is fed to the bed, and which is purged of non-oxygen gas when an inlet valve 12*c*, 12*c*'; 13*c*. 13*c*'; etc. is closed, and a vent outlet valve 12*d*, 12*d*'; 13*d*, 13*d*' etc. is opened to low pressure atmosphere. To assist purging, a small volume of oxygen enriched gas is passed over the bed during purging to assist flushing of non-oxygen gas from the sieve bed.

Each molecular sieve bed 12*a*, 12*b*; 13*a*, 13*b*; etc. of each pair, has an oxygen supply non-return outlet valve 12*a*', 12*b*', 13*a*', 13*b*' etc. which permits oxygen generated in the beds 12*a*, 12*b*; 13*a*; 13*b* etc. to pass via a respective oxygen enriched gas flow control device F1; F2; etc. to be described hereinafter, to the breathing gas supply line 11.

There is also a path for oxygen from the breathing gas supply line 11 via the oxygen enriched gas flow control devices F1; F2; etc. as described hereinafter, past the non return outlet valves 12*a*', 12*b*'; 13*a*', 13*b*' etc. to each of the beds 12*a*, 12*b*; 13*a*, 13*b*; etc., via a small orifice O1, O2; O3, O4 etc., which permits a small flow of oxygen to each of the beds during purging.

In FIG. 2, there are indicated a pair of compressed oxygen containers 19, 20 or bottles, each with its own non return outlet valve means 19', 20'. It will be appreciated from the description below that the volume of such compressed stored gas may be small, or the bottles 19, 20 may not be required at all, by utilizing the system 10.

The inlet and outlet valves 12*c*, 12*d* etc. of the molecular sieve beds 12*a*, 12*b*; 13*a*, 13*b*; etc. are all controlled by an electronic control unit 22, to which inputs may be provided from a pressure sensing device 23, which is operable to sense any sudden depressurization within the cabin of the aircraft.

Conventionally in the event of such emergency decompression, an emergency supply of oxygen gas would be provided to the individual breathing masks 16 for use by passengers, from the stored compressed oxygen supply 19, 20. Sufficient oxygen would need to be stored to allow the passengers to breath the emergency gas while the aircraft descends to the low altitude, according to the conventional flight profile A, C indicated in FIG. 1.

Where there are a substantial number of passengers present, and the aircraft is flying at a very high altitude, a substantial supply of oxygen would be required conventionally, requiring several large and heavy storage container 19, 20.

However, in the system 10 shown, in the event of an emergency decompression, the oxygen concentrating apparatus 12, 13 etc. are immediately operated to generate oxygen from the gas supply 17, and to provide the oxygen to the breathing gas supply line 11. If the MSOGS 12, 13, 14 etc. have not been designed to provide full passenger protection at higher altitudes, and an oxygen supply is demanded immediately upon decompression, either a small supply of oxygen e.g. in small storage containers 19, 20 may be provided, sufficient to supply breathing gas until the oxygen concentrating apparatus 12, 13 etc. are brought on line, and/or a supply of oxygen gas stored in the oxygen concentrating apparatus 12, 13 etc. and in the breathing gas supply line 11 as hereinafter explained, may be made available to the passengers.

It is desirable to keep the molecular sieve bed material dry and clean of non-oxygen contaminants. Because the oxygen concentrating apparatus 12, 13 etc. are only intended for use in an emergency situation, and thus rarely, if ever, to maintain the MSOGS in a working condition, the following method is performed, preferably while the aircraft is on the ground prior to flight, or otherwise when the aircraft is not likely to be subjected to an emergency cabin decompression.

One of the oxygen concentrating apparatus 12, 13 etc., in this example oxygen concentrating apparatus 12, or at least one of the molecular sieve beds 12$a$, 13$a$ of the oxygen concentrating apparatus 12, is designated a main oxygen concentrating apparatus, whilst each of the others is designated an auxiliary oxygen concentrating apparatus. The main oxygen concentrating apparatus 12 is operated to produce dry oxygen enriched gas which is fed past the non-return valves 12$a$', 12$b$', via the associated oxygen enriched gas flow control device F1, into the breathing gas supply line 11.

The oxygen enriched gas may pass from the breathing gas supply line 11 to each of the molecular sieve beds 13$a$, 13$b$; 14$a$, 14$b$; etc. of the auxiliary oxygen concentrating apparatus 13, 14 etc. via a respective oxygen enriched gas flow control device F2, F3 etc. and the orifices O2, O3 etc., whilst the vent outlet valves 13$d$, 13$d$'; 14$d$, 14$d$'; etc. are open, so that the Zeolite or other molecular sieve material of the MSOGS of the auxiliary oxygen concentrating apparatus 13, 14 etc., is purged of non-oxygen gas. In FIG. 2, the flow path from the breathing gas supply line 11 to the auxiliary oxygen concentrating apparatus 13, 14 etc. is shown emboldened.

This will also pre-oxygenate and condition the beds of the auxiliary oxygen concentrating apparatus 13, 14 etc. ready for use should the need arise.

In FIG. 2, and as described above, the main oxygen concentrating apparatus 12, and each of the auxiliary oxygen concentrating apparatus 13, 14 etc. when operative, operate in tandem so that one of the molecular sieve beds, e.g. bed 12$a$ of the main oxygen concentrating apparatus 12 is adsorbing non-oxygen gas, whilst the other molecular sieve bed 12$b$ is desorbing oxygen, and so on for each of the concentrating apparatus 12, 13, 14 etc.

The enriched gas flow control devices F1, F2, F3 etc. each includes a first flow path F1$a$, F2$a$, F3$a$ etc. which includes a non-return valve, which permits oxygen enriched gas produced by the concentrating apparatus 12, 13, 14 etc. to flow substantially unimpeded, to the breathing gas supply line 11, but prevents the flow of breathing gas from the breathing gas line 11 through the first flow path F1$a$, F2$a$, F3$a$, etc. to the oxygen concentrating apparatus 12, 13, 14 etc.

In FIG. 2, where for example the main oxygen concentrating apparatus 12 is operating with the molecular sieve bed 12$a$ adsorbing non-oxygen gas and the molecular sieve bed 12$b$ desorbing non-oxygen gas, the oxygen enriched gas flow path from the adsorbing sieve bed 12$a$, via non-return valve 12$a$' and the first flow path F1$a$ to the breathing gas supply line 11 is shown emboldened.

The oxygen enriched gas flow control devices F1, F2, F3 etc. further each includes a second gas flow path F1$b$, F2$b$, F3$b$ etc. which includes a respective restrictor in the form of a small orifice through which oxygen enriched gas from the breathing gas supply line 11 may flow through the respective oxygen enriched gas flow control device F1, F2, F3 etc. to the oxygen concentrating apparatus 12, 13, 14 etc. However the cross sectional areas of the orifices of the second flow paths F1$b$, F2$b$, F3$b$ etc. are smaller than the cross sectional areas of the orifices O1, O2, O3, O4, etc. closer to the oxygen concentrating apparatus 12, 13, 14, etc. and consequently, when a molecular sieve bed such as the molecular sieve bed 12$a$ of the main oxygen concentrating apparatus 12, is operating so that the bed 12$a$ is producing oxygen enriched gas, oxygen enriched gas to assist in purging of the desorbing bed 12$b$ is preferentially provided direct from the adsorbing bed 12$a$ rather than from the breathing gas supply line 11.

Thus in an emergency situation for example, when the demand for breathing gas is at a maximum, and all of the oxygen concentrating apparatus 12, 13, 14, etc. are producing oxygen enriched gas, and there is also a maximum demand for oxygen enriched gas for assisting purging of desorbing beds 12$b$ etc., there is less risk of the system 10 performance being adversely affected by large volumes of breathing gas from the breathing gas supply line 11 being used for assisting purging of desorbing beds rather than being available for breathing.

The cross sectional areas of the small orifices of the second flow paths F1$b$, F2$b$, F3$b$, of the oxygen enriched gas flow control devices F1, F2, F3 etc. are preferably sufficiently small only to permit only a very small flow of oxygen enriched gas through the second flow paths F1$b$, F2$b$, F3$b$ sufficient to condition the beds 12$a$, 12$b$; 13$a$, 13$b$; 14$a$, 14$b$ etc. when the beds are not in use.

Figure 3:
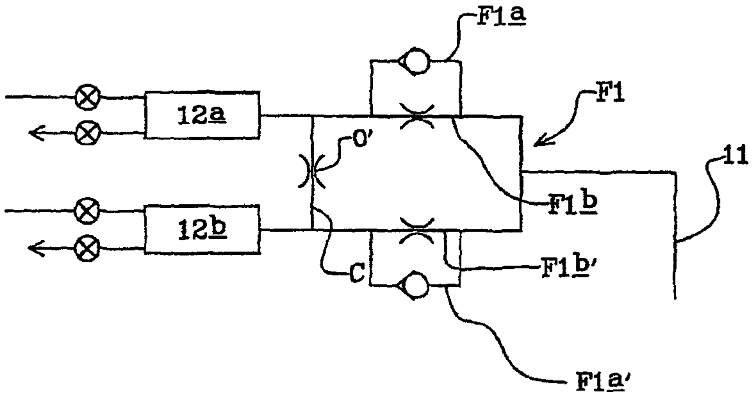
FIG. 3 is an illustrative view of a modified part of a breathing gas supply system of the present invention.

In FIG. 3 there is shown part only of the breathing gas supply system 10 of FIG. 2, but modified, with the same parts being indicated by the same reference numerals.

In this modification, the non-return outlet valves 12$a$', 12$b$', 13$a$', 13$b$' etc. which permit oxygen generated in the beds 12$a$, 12$b$, 13$a$, 13$b$ etc. to pass to the respective oxygen enriched gas flow control means and the small orifices O1, O2, O3 etc. are all dispensed with, but the molecular sieve beds 12$a$, 12$b$ are connected via a conduit C which includes a single orifice O'.

The oxygen enriched gas flow control means F1 includes a first and second flow path F1$a$, F1$b$ and F1$a$', F1$b$' for each of the molecular sieve beds 12$a$, 12$b$. Thus when the oxygen concentrating apparatus 12 is inoperative but it is desired to permit a small flow of oxygen enriched gas to the beds 12$a$, 12$b$ to maintain the condition of the beds, such gas may pass to each of the beds via the respective second flow paths F1$b$, F1$b$' which contain small orifices. When the oxygen concentrating apparatus 12 is operative and either one of the beds 12$a$, 12$b$ is adsorbing non-oxygen gas, the oxygen enriched gas may pass via the respective first flow path F1$a$, F1$a$' to the breathing gas supply line 11. The cross sectional area of the orifice O' is larger than the cross sectional areas of the orifices of the second flow paths F1$b$, F1$b$'. Thus oxygen enriched gas to assist in purging a desorbing bed, is preferentially provided direct from the adsorbing bed of the pair of beds 12$a$, 12$b$ of the oxygen concentrating apparatus 12, rather than from the breathing gas supply line 11.

Figure 4:
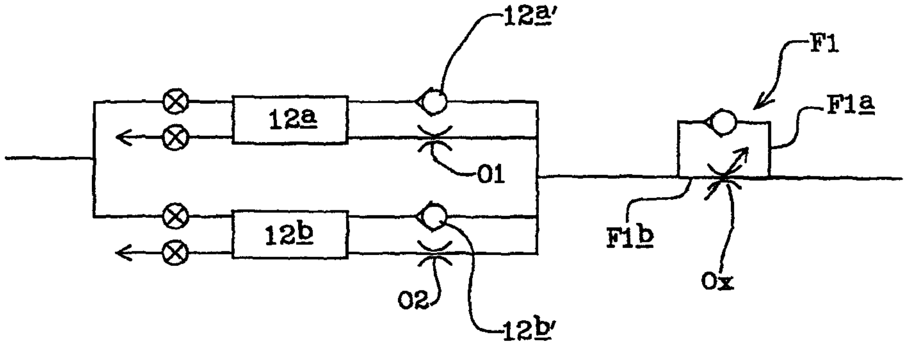
FIG. 4 is an illustrative view of an alternatively modified part of a breathing gas supply system of the present invention.

In FIG. 4, there is shown another modification which is more similar to the arrangement of FIG. 2 but the simple orifice of the second flow path F1$b$ of the respective oxygen enriched gas flow control device F1 is replaced with a variable cross section orifice Ox, which may be actuated to increase or reduce the cross section and hence the flow of oxygen enriched gas through the second flow path F1$b$ of the oxygen enriched gas flow control device F1.

In each example, during conditioning of the auxiliary oxygen concentrating apparatus 13, 14 etc., the main oxygen concentrating apparatus 12 may continue to be operated, while vent outlet valves 13$d$, 13$d$', 14$d$, 14$d$' etc. of the auxiliary oxygen concentrating apparatus 13, 14 etc. are closed. Thus each MSOG 13$a$, 13$b$, 14$a$, 14$b$ etc. and the breathing gas supply line 11 will fill with oxygen supplied by the main oxygen concentrating apparatus 12 up to the pressure of the supply gas inlet 17.

Provided that the vent outlet valves 12$d$, 12$d$', 13$d$, 13$d$' etc. are able to maintain the store of oxygen in the oxygen concentrating apparatus 12, 13 etc. and depending on the capacity of the oxygen concentrating apparatus 12, 13, etc. and the breathing gas supply line 11 etc. an oxygen supply will be immediately available for breathing in the event that a sudden cabin decompression is experienced and thus the compressed oxygen bottles 19, 20 may not be required at all.

Any number of oxygen concentrating apparatus 12, 13 etc. may be provided adequate to provide sufficient oxygen for breathing for a pronged period e.g. at least 30 minutes, and to provide an adequately fast start-up. A greater number of smaller capacity oxygen concentrating apparatus 12, 13, 14 etc. may be provided where this is essential for packaging within the aircraft, or a smaller number of greater capacity oxygen concentrating apparatus 12, 13, 14 etc. may be provided where there is space. In a practical example, the oxygen concentrating apparatus 12, 13, 14 etc. may be arranged in a linear array or may be provided in a radial array as with a common air supply plenum and/or breathing gas supply plenum.

Where the vent valves 12*d*, 12*d*', 13*d*, 13*d*' are not designed to maintain the oxygen store in the oxygen concentrating apparatus, the molecular sieve beds will be exposed to low pressure as the aircraft operates at high altitude thus maintaining the condition of the beds. If desired, the main oxygen concentrating apparatus 12 may be operated continuously in flight in such a situation, to maintain a steady supply of oxygen enriched gas to the breathing gas supply line 11 and hence to permit oxygen enriched gas to be available for supplying to the molecular sieve beds of each of the auxiliary oxygen concentrating apparatus 13, 14 etc.

Where each of the main 12 and auxiliary 13, 14 etc. oxygen concentrating apparatus is the same, i.e. is an MSOG of generally the same capacity, it will be appreciated that any of the oxygen concentrating apparatus 12, 13 etc. may perform the role of the main oxygen concentrating apparatus. Preferably the selection of an oxygen concentrating apparatus 12, 13, 14 etc. to use as a main oxygen concentrating apparatus is sequenced so that each oxygen concentrating apparatus 12, 13, 14 etc. takes a turn at supplying oxygen enriched gas to purge the other beds and provide an emergency oxygen store. Thus prior to each flight, or a plurality of flights or after so many flying hours, a different main oxygen concentrating apparatus 12, 13, 14 etc. is selected. In this way, each bed will age similarly.

The two beds 12*a*, 12*b* of the main oxygen concentrating apparatus 12 and each of the auxiliary oxygen concentrating apparatus 13, 14 etc. when operated, may be operated symmetrically, or asymmetrically as desired.

In a modified example, instead of each oxygen concentrating apparatus 12, 13 etc. being a two molecular sieve bed 12*a*, 12*b*, 13*a*, 13*b* device, some or all of the oxygen concentrating apparatus may have three or more beds, but in each case when the oxygen concentrating apparatus is operated, at least one bed is preferably active to adsorb non-oxygen gas, whilst another of the beds is being purged and preferably is being supplied with a small flow of oxygen enriched gas provided preferentially direct from the adsorbing bed, to assist purging.

It will be appreciated that is it desirable to test the performance of individual oxygen concentrating apparatus 12, 13 etc. To achieve this, preferably periodically each of the oxygen concentrating apparatus 12, 13 etc. or even each individual bed 12*a*, 12*b*, 13*a*, 13*b* etc. thereof is operated sequentially with the gas pressure in the breathing gas supply line 11 being monitored as by a pressure sensor 32 and/or with the oxygen concentration in the breathing gas supply line being monitored e.g. by sensors 33, 34. By monitoring pressure, the performance of the individual inlet and outlet valves 12*c*, 12*d*' etc. and the fluid tightness of containers etc. containing the molecular sieve bed materials, can be tested. By monitoring oxygen content of the gas in the breathing gas line 11, the performance, e.g. state of contamination of the molecular material of the beds 12*a*, 12*b*, 13*a*, 13*b* etc. can be monitored, and in both cases, remedial action taken as necessary.

If it is desired to provide an oxygen supply during flight, at least one of the oxygen concentrating apparatus, typically the main supply means 12, may be isolated from the breathing gas supply line 11, to enable the oxygen supply to be available. This oxygen supply may be used in conjunction with the environmental control system usually present in an aircraft to maintain a desired oxygen concentration in the pressurized cabin during normal flight. Thus the size of, or even need of, a compressor currently required to introduce external air into the cabin at pressure, may be avoided.

In order to reduce weight, the sizes of the main and auxiliary oxygen concentrating apparatus 12, 13 etc. may carefully be chosen so that an adequate oxygen supply is available for breathing at the reduced flying height, e.g. a breathing gas supply containing only 80% oxygen, rather than providing larger capacity, and heavier oxygen concentrating apparatus 12, 13 etc. which may be capable of supplying a maximum concentration of oxygen in the breathing gas, which may be up to 97% in the case of molecular sieve beds.

The breathing system 10 described, may be applied to a military aircraft when only crew, and possibly one or few other persons are in the aircraft but all personnel require a breathing gas supply, less than all of the oxygen concentrating apparatus 12-14 may be operated, whilst the adsorbing beds of unused apparatus are kept conditioned, so that for any future mission when more personnel may be present in the aircraft, the capacity of the breathing gas system 10 may readily be increased.

A breathing gas supply may be required in a military aircraft, for examples when the aircraft is liable to damage to the cabin from hostile fire, or when the cabin is open to atmosphere activity, e.g. during parachute drops, or when the cabin air is contaminated.

The invention claimed is:

1. In a breathing gas supply system for an aircraft including a plurality of oxygen concentrating apparatus connected in parallel to supply oxygen enriched gas to a single breathing gas system supply line, each oxygen concentrating apparatus including at least two molecular sieve beds which are operable so that while at least one sieve bed is adsorbing non-oxygen gas from a pressurized gas supply at least one other sieve bed is purged of non-oxygen gas by subjecting the bed to a pressure lower than the pressurized gas supply and a flow of oxygen enriched purge gas, the improvement wherein each oxygen concentrating apparatus includes an oxygen enriched gas flow control device which permits the flow of oxygen enriched gas produced by the oxygen concentrating apparatus to the breathing gas system supply line, each oxygen concentrating apparatus includes a flow path for providing oxygen enriched gas produced by an adsorbing sieve bed of the oxygen concentrating apparatus direct to at least one bed in such oxygen concentrating apparatus for providing a restricted flow of purge gas to such bed, and means for providing an alternate restricted flow of oxygen enriched purge gas from the breathing gas system supply line to an oxygen concentrating apparatus when a sufficient flow of purge gas is not available from an adsorbing sieve bed in such apparatus for purging a sieve bed within such apparatus.

2. A system according to claim 1 wherein the oxygen enriched gas flow control device for each oxygen concentrating apparatus includes a first flow path including a non-return valve which permits a substantially free flow of oxygen enriched gas produced by such oxygen concentrating apparatus to the breathing gas system supply line, and a second flow path in parallel with said first flow path including a flow restrictor which permits a limited flow of oxygen enriched gas from the breathing gas system supply line back to such oxygen concentrating apparatus for purging a sieve bed when the pressure of the breathing gas system supply line is greater than the pressure of the available purge gas in such oxygen concentrating apparatus.

3. A system according to claim 2 wherein the restrictor in the second flow path in each oxygen concentrating apparatus includes an orifice through which oxygen enriched purge gas from the breathing gas system supply line is constrained to flow.

4. A system according to claim 2 wherein the restrictor in the second flow path in each oxygen concentrating apparatus includes a variable orifice the cross section of which is variable according to operating conditions controlled by a system controller.

5. A system according to claim 1 wherein for each oxygen concentrating apparatus, the flow path for oxygen enriched gas produced by an adsorbing sieve bed in such oxygen concentrating apparatus direct to a bed being purged in such oxygen concentrating apparatus includes an orifice for limiting the flow of oxygen enriched purge gas along the flow path.

6. A system according to claim 5 and wherein for each oxygen concentrating apparatus, the oxygen enriched gas flow control device includes a first flow path including a non-return valve which permits a substantially free flow of oxygen enriched gas produced by such oxygen concentrating apparatus to the breathing gas system supply line, and a second flow path which includes a restrictor which permits a restricted flow of purge gas from the breathing gas system supply line to such oxygen concentrating apparatus and wherein the orifice in the flow path for oxygen enriched purge gas from an adsorbing sieve bed to another sieve bed within such oxygen concentrating apparatus is larger than the restrictor in the second flow path of such oxygen enriched gas flow control device.

7. A system according to claim 1 wherein each oxygen concentrating apparatus includes two molecular sieve beds operated in tandem.

8. A system according to claim 1 wherein at least one of the oxygen concentrating apparatus is a main oxygen concentrating apparatus and all of the other oxygen concentrating apparatus in the system are auxiliary oxygen concentrating apparatus, wherein the main oxygen concentrating apparatus is operable independently of the auxiliary oxygen concentrating apparatus, and wherein the main oxygen concentrating apparatus is operable alone to supply oxygen enriched gas to all auxiliary oxygen concentrating apparatus via the oxygen enriched gas flow control device and the breathing gas system supply line.

9. A method of operating a breathing gas supply system for an aircraft, said system including a plurality of oxygen concentrating apparatus each of which is operable in use to supply oxygen enriched gas to a breathing gas system supply line, each oxygen concentrating apparatus including at least two molecular sieve beds which are operable so that while at least one sieve bed in the apparatus is adsorbing non-oxygen gas from a pressurized gas supply at least one other sieve bed is being purged of non-oxygen gas by subjecting the bed to a pressure lower than the pressurized gas supply pressure and a flow of oxygen enriched purge gas, each oxygen concentrating apparatus including an oxygen enriched gas flow control device and a flow path for oxygen enriched gas produced by the adsorbing sieve bed of such oxygen concentrating apparatus direct to a bed being purged, the method including operating the oxygen enriched gas flow control devices to permit a flow of oxygen enriched gas produced by the operating oxygen concentrating apparatus to the breathing gas system supply line, to permit a limited flow of oxygen enriched gas produced by an adsorbing sieve bed of each oxygen concentrating apparatus to flow as purge gas direct to a bed being purged within such oxygen concentrating apparatus, and to permit a restricted flow of oxygen enriched gas from the breathing gas supply line to a bed being purged in any oxygen concentrating apparatus where a sufficient flow of purge gas is not available from the adsorbing sieve bed in such apparatus for purging such sieve bed.

10. A breathing gas supply system for an aircraft including a plurality of oxygen concentrating apparatus which in use are operable to independently supply oxygen enriched gas in parallel to a single breathing gas system supply line, each oxygen concentrating apparatus including at least two molecular sieve beds which are operable so that while at least one molecular sieve bed is adsorbing non-oxygen gas from gas from a pressurized gas supply to produce oxygen enriched product gas at least one other molecular sieve bed is purged of non-oxygen gas by subjecting such sieve bed to a pressure lower than the pressure of the pressurized gas supply and to a flow of oxygen enriched purge gas, means for delivering a portion of the oxygen enriched product gas to the breathing gas system supply line and for delivering another portion of the oxygen enriched product gas as purge gas to each molecular sieve bed being purged, and means for providing oxygen enriched gas from the breathing gas supply line to any sieve bed being purged in the plurality of oxygen concentrating apparatus which does not receive a sufficient flow of purge gas for purging non-oxygen gas in such sieve bed from the adsorbing bed in the oxygen concentrating apparatus in which such sieve bed being purged is located.

11. A breathing gas supply system for an aircraft, as set forth in claim 10, and wherein each of said plurality of oxygen concentrating apparatus are independently operated, wherein at least one of the oxygen concentrating apparatus is a main oxygen concentrating apparatus and at least one of the oxygen concentrating apparatus is an auxiliary oxygen concentrating apparatus, and wherein the main oxygen concentrating apparatus is operable alone to supply oxygen enriched gas to the breathing gas system supply line and as purge gas to each auxiliary oxygen concentrating apparatus via the breathing gas system supply line.

* * * * *